(12) United States Patent
Izumi

(10) Patent No.: US 10,761,037 B2
(45) Date of Patent: Sep. 1, 2020

(54) LASER PROCESSING DEVICE FOR DETERMINING THE PRESENCE OF CONTAMINATION ON A PROTECTIVE WINDOW

(71) Applicant: FANUC CORPORATION, Minamitsuru-gun, Yamanashi (JP)

(72) Inventor: Takashi Izumi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/194,654

(22) Filed: Nov. 19, 2018

(65) Prior Publication Data

US 2019/0219522 A1 Jul. 18, 2019

(30) Foreign Application Priority Data

Nov. 24, 2017 (JP) .................................. 2017-226147

(51) Int. Cl.
*G01N 21/956* (2006.01)
*B23K 26/03* (2006.01)
(Continued)

(52) U.S. Cl.
CPC ....... *G01N 21/95607* (2013.01); *B23K 26/03* (2013.01); *B23K 26/032* (2013.01);
(Continued)

(58) Field of Classification Search
CPC .. B23K 26/03; B23K 26/032; B23K 26/0648; B23K 26/706; B23K 26/707;
(Continued)

(56) References Cited

U.S. PATENT DOCUMENTS

| | | | | |
|---|---|---|---|---|
| 5,179,422 A | * | 1/1993 | Peterson | G01N 21/94 250/559.41 |
| 5,427,733 A | * | 6/1995 | Benda | B22F 3/1055 419/1 |
| 5,530,221 A | * | 6/1996 | Benda | B22F 3/1055 219/121.83 |
| 7,330,579 B2 | * | 2/2008 | Edwards | G01M 11/02 382/141 |

(Continued)

FOREIGN PATENT DOCUMENTS

JP H01186296 A 7/1989
JP 2002-361452 A 12/2002
(Continued)

*Primary Examiner* — Violeta A Prieto
(74) *Attorney, Agent, or Firm* — RatnerPrestia

(57) ABSTRACT

A laser processing device includes a beam splitter disposed between a focusing lens and a protective window, a return light measurement unit configured to measure intensity distribution of a return light reflected from a workpiece and returning to an external optical system via the beam splitter, a storage unit configured to store at least one of normal pattern data representing the intensity distribution of the return light when the protective window is in normal condition and abnormal pattern data representing the intensity distribution of the return light when the protective window is contaminated, a processing unit configured to perform a process of detecting contamination of the protective window during laser processing based on measurement data about the return light and at least one of the normal pattern data and the abnormal pattern data, and a warning unit configured to warn of contamination of the protective window in accordance with the process.

6 Claims, 5 Drawing Sheets

(51) Int. Cl.
   *B23K 26/06* (2014.01)
   *B23K 26/70* (2014.01)
   *G01N 21/94* (2006.01)
   *G01M 11/02* (2006.01)
   *G01N 21/958* (2006.01)
   *G01N 21/55* (2014.01)

(52) U.S. Cl.
   CPC ........ *B23K 26/0648* (2013.01); *B23K 26/706* (2015.10); *B23K 26/707* (2015.10); *G01M 11/02* (2013.01); *G01N 21/55* (2013.01); *G01N 21/94* (2013.01); *G01N 21/958* (2013.01); *G01N 2021/95615* (2013.01)

(58) Field of Classification Search
   CPC ................ G01M 11/02; G01M 11/005; G01N 2021/95615; G01N 21/95607; G01N 21/958; G01N 21/55
   See application file for complete search history.

(56) References Cited

U.S. PATENT DOCUMENTS

| | | | |
|---|---|---|---|
| 8,976,250 B2* | 3/2015 | Armstrong-Muntner | ................... G01M 11/005 348/180 |
| 9,662,744 B2 | 5/2017 | Chida et al. | |
| 2004/0114135 A1* | 6/2004 | Edwards | ................ G01M 11/02 356/239.2 |
| 2013/0293726 A1* | 11/2013 | Armstrong-Muntner | ................... G01M 11/005 348/187 |
| 2019/0160599 A1* | 5/2019 | Izumi | ................... B23K 26/707 |

FOREIGN PATENT DOCUMENTS

| | | |
|---|---|---|
| JP | 2013099783 A | 5/2013 |
| JP | 2013-233593 A | 11/2013 |
| JP | 2016-097412 A | 5/2016 |
| JP | 2016-530611 A | 9/2016 |
| JP | 2017151933 A | 8/2017 |

* cited by examiner

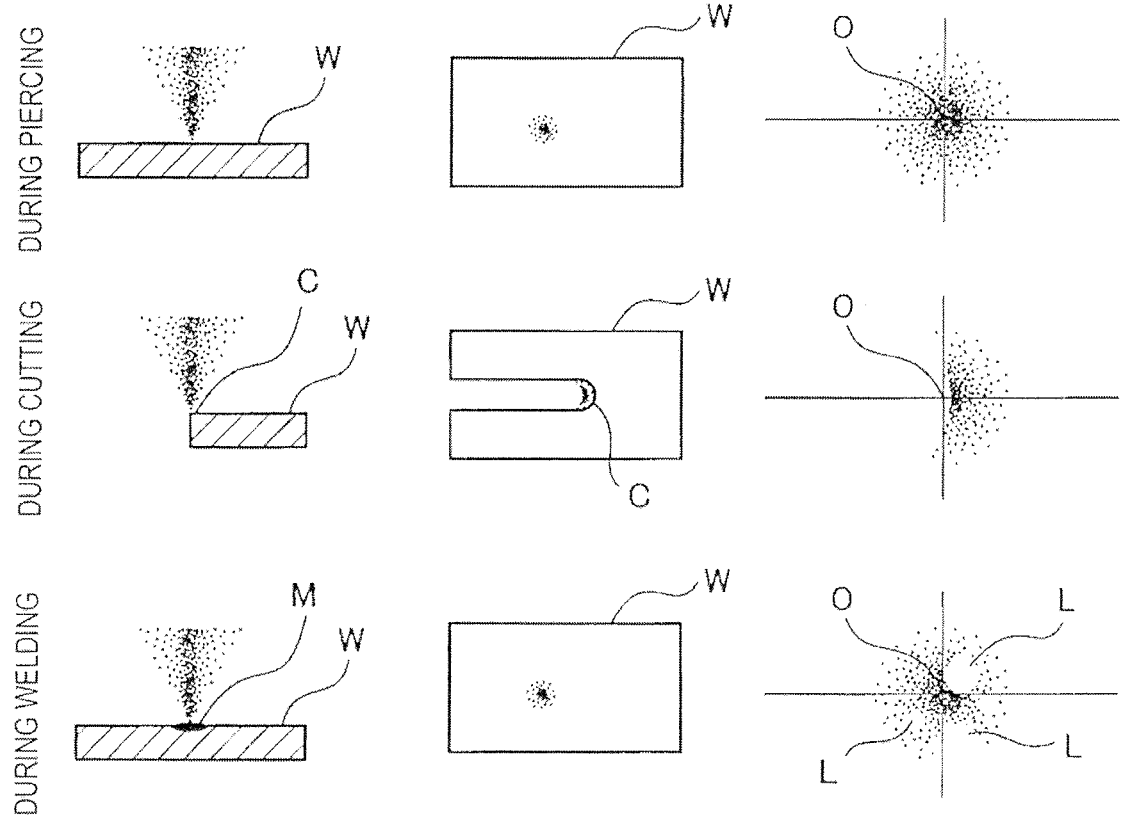

FIG. 3A
NORMAL PATTERN
FIG. 3B
ABNORMAL PATTERN
DURING PIERCING
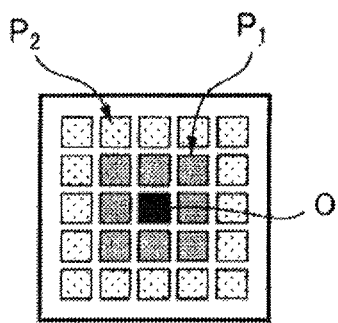
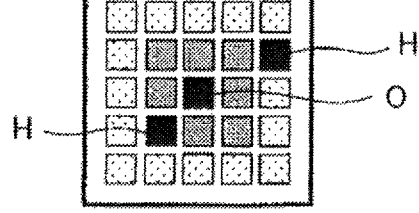
DURING CUTTING
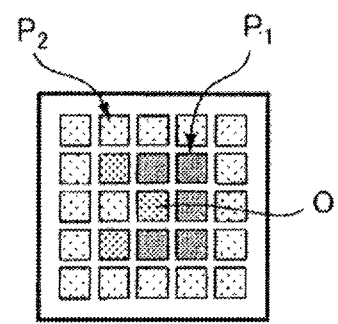
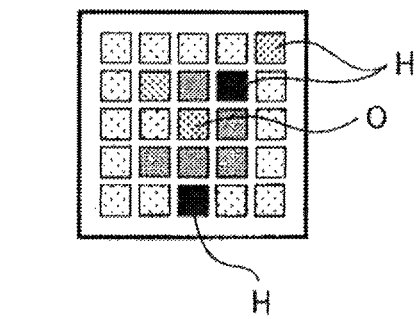
DURING WELDING
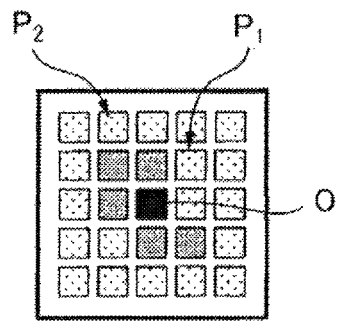
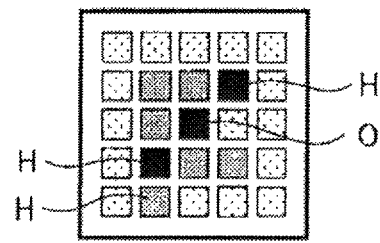

LASER PROCESSING DEVICE FOR DETERMINING THE PRESENCE OF CONTAMINATION ON A PROTECTIVE WINDOW

CROSS-REFERENCE TO RELATED APPLICATION

This application is a new U.S. Patent Application that claims benefit of Japanese Patent Application No. 2017-226147, filed Nov. 24, 2017 for all purposes.

BACKGROUND OF THE INVENTION

1. Field of the Invention

The present invention relates to laser processing devices, and in particular, relates to laser processing devices. warning of contamination of a protective window during laser processing.

2. Description of the Related Art

Laser processing is performed by presetting the focal position based on, for example, the material to be cut using laser and the thickness. In case of processing defects, an external optical system for applying a light output from a laser oscillator to a workpiece is checked whether the external optical system is contaminated, or contamination of the external optical system is detected using a temperature sensor, a scattered light sensor, or the like attached to the external optical system.

As for techniques related to the present invention, documents below, for example, are well-known. In JP 2016-530611 T, a system for evaluating the state of a process is disclosed. The system applies an output laser beam to a workpiece via a semitransparent magic mirror disposed between a collimator and a focal lens, causes a reflected light to reflect from the magic mirror, and receives the light using a camera to evaluate processing quality.

In JP 2016-097412 A, a laser welding method capable of readily restraining poor welding in a case where spatters adhere to protective glass is disclosed. In the laser welding method, a low power laser beam for testing is applied to a welding portion, and a return light is received via a mirror disposed upstream of a focusing lens to calculate the decrement of laser output and the amount of focal deviation by comparing the intensity of the return light with a reference intensity to adjust the output and the focal length of a laser oscillator before laser welding.

In JP 2002-361452 A, a laser processing system measuring the degree of contamination of protective glass is disclosed. The laser processing system includes a radiation detector measuring the intensity of scatter radiation from protective glass and another radiation detector measuring the intensity of a laser beam via a partially permeable mirror disposed behind a lens mechanism focusing the laser beam to compensate influences of the radiation intensity of the laser beam on measured values of scattered radiation.

In JP 2013-233593 A, a laser processing device determining the quality of a processed state is disclosed. The laser processing device includes an optical sensor for detecting the spatial distribution of light emitted from a processing point in at least two directions.

SUMMARY OF THE INVENTION

An external optical system degrades over time. In particular, a protective window easily gets contaminated during laser processing and needs to be cleaned or replaced when contaminated. Delay in maintenance timing causes the quality of laser processing to significantly deteriorate.

Thus, a technique to accurately warn of contamination of the protective window during laser processing has been required.

An aspect of the disclosure provides a laser processing device warning of contamination of a protective window during laser processing, the laser processing device including a laser oscillator, an external optical system including a focusing lens configured to focus a light output from the laser oscillator and the protective window disposed downstream of the focusing lens, a beam splitter disposed between the focusing lens and the protective window, a return light measurement unit configured to measure intensity distribution of a return light reflected from a workpiece and returning to the external optical system via the beam splitter, a storage unit configured to store at least one of normal pattern data representing the intensity distribution of the return light from the workpiece when the protective window is in normal condition and abnormal pattern data representing the intensity distribution of the return light from the workpiece when the protective window is contaminated, a processing unit configured to perform a process of detecting contamination of the protective window during laser processing, and a warning unit configured to warn of contamination of the protective window in accordance with the process performed by the processing unit, the processing unit including a contamination detecting section configured to detect contamination of the protective window based on measurement data about the return light and at least one of the normal pattern data and the abnormal pattern data.

BRIEF DESCRIPTION OF THE DRAWINGS

FIG. 2A illustrates longitudinal sections of output lights.

FIG. 2B illustrates plan views of return lights.

FIG. 2C illustrates enlarged views of the return lights during piercing, cutting, and welding.

FIG. 3A illustrates a plan view illustrating normal patterns representing the intensity distribution of the return lights during piercing, cutting, and welding.

FIG. 3B illustrates a plan view illustrating abnormal patterns representing the intensity distribution of the return lights during piercing, cutting, and welding.

DETAILED DESCRIPTION

Figure 1:
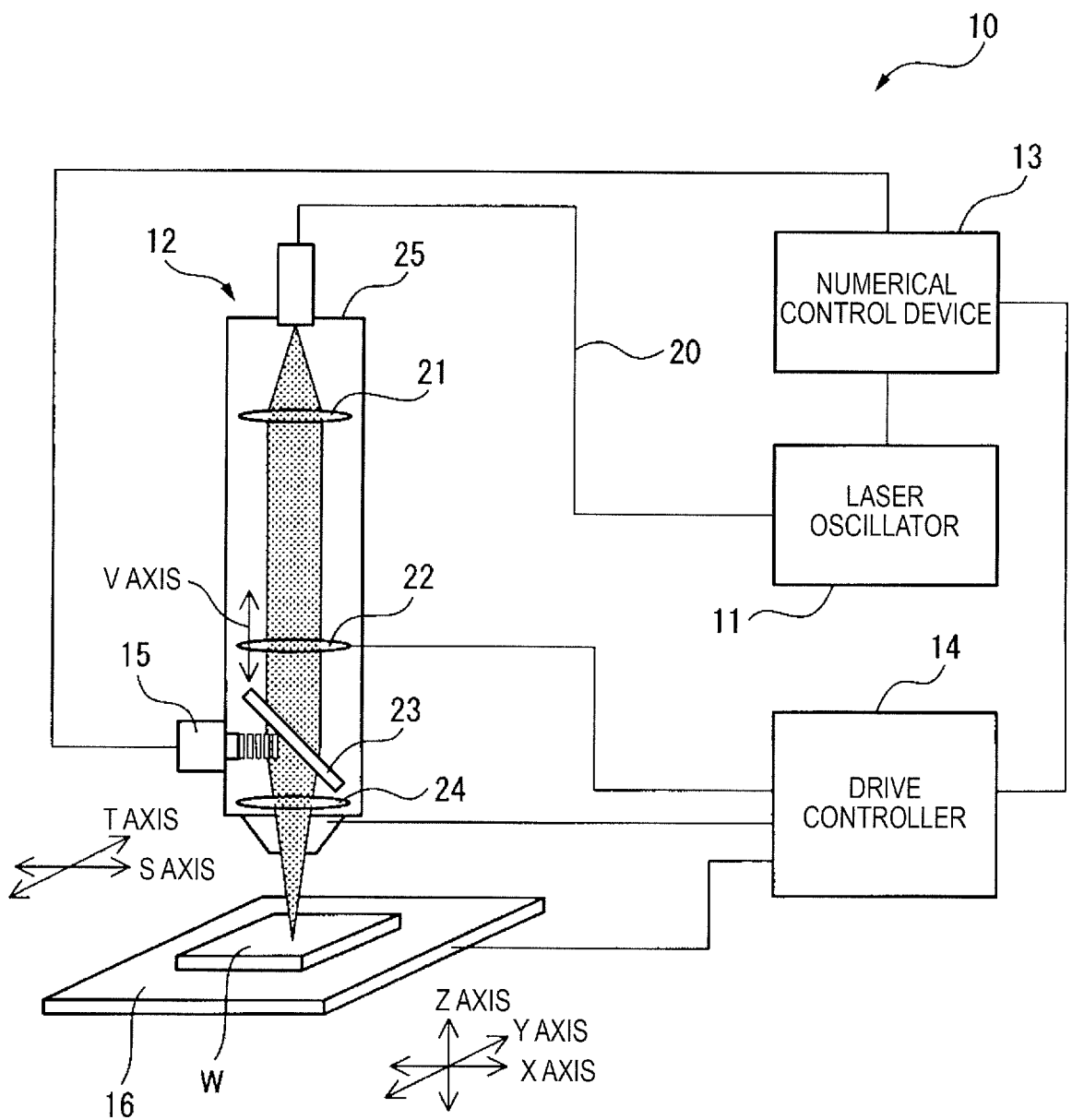
FIG. 1 is a schematic diagram illustrating the overall configuration of a laser processing device according to one embodiment.

Embodiments of the present disclosure will be described in detail below with reference to the accompanying drawings. In the drawings, identical or similar constituent elements are given identical or similar reference signs. Additionally, the embodiments described below are not intended to limit the technical scope of the invention or the meaning of terms set forth in the claims.

FIG. 1 is a schematic diagram illustrating the overall configuration of a laser processing device according to the present embodiment. A laser processing device 10 includes a laser oscillator 11, an external optical system 12 guiding a light output from the laser oscillator 11 to apply the light to a surface of a workpiece, a numerical control device 13 controlling the entire laser processing device 10, and a drive controller 14 controlling driving of the laser processing device 10. The laser oscillator 11 is, for example, a fiber laser oscillator with a wavelength from 1060 to 1080 nm. The external optical system 12 includes a fiber 20 guiding the light output from the laser oscillator 11, a collimator lens 21 collimating the light output from the fiber 20, a focusing lens 22 focusing the output light, a beam splitter 23 partially reflecting and partially passing the output light or a return light, and a protective window 24 disposed downstream of the focusing lens 22. The drive controller 14 includes an X axis, a Y axis, and a Z axis that move a work table 16, a V axis that moves the position of the focusing lens 22 in the optical axis direction, an S axis and a T axis that move the protective window 24 in directions orthogonal to the optical axis of the output light, and components such as servo motors and controllers that drive the axes.

The laser processing device 10 further includes a return light measurement unit 15 measuring the intensity distribution of the return light reflected from a workpiece W and returning to the external optical system 12 via the beam splitter 23 during laser processing. The beam splitter 23 is disposed inside a linear processing head 25 between the focusing lens 22 and the protective window 24 at an angle of 45° with respect to the optical axis. As there is no optical part other than the beam splitter 23 between the protective window 24 and the return light measurement unit 15, contamination of the protective window 24 can be accurately detected. The return light measurement unit 15 is disposed at a position forming an angle of 90° with the optical path of the output light in the forward direction, and includes a plurality of sensor elements (e.g., photoelectric elements, etc.) arranged two-dimensionally, a plurality of sensor elements (e.g., thermocouples, etc.) arranged concentrically, or a component such as a CCD camera or a CMOS camera.

FIG. 2A illustrates longitudinal sections of output lights, FIG. 2B illustrates plan views of return lights, and FIG. 2C illustrates enlarged views of the return lights during piercing, cutting, and welding. During piercing, in the intensity distribution of the return light, the intensity is high at around an optical axis O and decreases toward the periphery of the optical axis O. During cutting, only the light reflected from a cut portion C of the workpiece W constitutes the return light, and thus the intensity distribution of the return light is substantially crescent. During welding, only the light reflected from a melted portion M of the workpiece W constitutes the return light. Thus, the intensity distribution of the return light includes glittering low intensity portions L caused by scattered light and always changes without being stable. In this manner, the intensity distribution of the return light changes depending on the types of laser processing even when the protective window 24 is in normal condition.

FIGS. 3A and 3B illustrate plan views illustrating normal patterns and abnormal patterns representing the intensity, distribution of the return lights during piercing, cutting, and welding. In a case where contamination of the protective window exists, high intensity portions H sparsely appear around the optical axis O. During piercing, the return light has substantially one normal pattern of the intensity distribution, and contamination of the protective window 24 can be detected by simply subtracting the normal pattern data from the return light measurement data. During cutting, although the number of normal patterns of the intensity distribution of the return light increases depending on the cutting direction; contamination of the protective window 24 can be detected by subtracting the normal pattern corresponding to the cutting direction during processing from the return light measurement data. However, during welding, the positions, the sizes, and the number of low intensity portions L caused by scattered light always change, and there is no normal pattern during processing. Thus, contamination of the protective window 24 cannot be detected by the above-described subtraction processing. To solve this, the laser processing device according to the present embodiment detects abnormality in the protective window 24 by pattern recognition (machine learning) using the normal patterns and the abnormal patterns without depending on the types of laser processing.

Specifically, a linear discriminant function u (i.e., equation of a straight line) for discriminating contamination of the protective window 24 is defined as follows, where $x_1$ is the number of sensor elements detecting intensity of the return light higher than a predetermined intensity in a set $P_1$ of sensor elements surrounding the optical axis O, $x_2$ is the number of sensor elements detecting intensity of the return light higher than a predetermined intensity in a set $P_2$ of sensor elements surrounding the set $P_1$ of the sensor elements, $w_1$ and $w_2$ are weights for $x_1$ and $x_2$, respectively, and $w_0$ is a bias (hereinafter, $w_0$, $w_1$, and $w_2$ are simply referred to as "weights").

$$u=w_0+w_1x_1+w_2x_2$$

When the discriminant function u>0, it can be determined that contamination of the protective window 24 exists, and when the discriminant function u<0, it can be determined that contamination of the protective window 24 does not exist. To determine the parameters $w_0$, $w_1$, and $w_2$ (i.e., weights) of the discriminant function, (1) a random value is set to each of $w_0$, $w_1$, and $w_2$, (2) $x_1$ and $x_2$ are input using at least one of the normal pattern data and the abnormal pattern data as teaching data, (3) when the output is not correct (i.e., when it is determined that contamination exists although a normal pattern is read or when it is determined that contamination does not exist although an abnormal pattern is read), the values of the weights are updated in the correct direction, and (4) when there is an update, the steps (1) to (3) are repeated to perform learning. The learning ends when correct outputs are made for all the teaching data. A known gradient descent and the like can be used for the process of updating the values of the weights, and a weight update expression, for example, is defined as follows.

$$w_i \leftarrow w_i + ptx_i$$

$$0 < p < 1 \text{ (LEARNING RATE)}$$

$$t = \begin{cases} 1 & \text{(WITH CONTAMINATION)} \\ -1 & \text{(WITHOUT CONTAMINATION)} \end{cases}$$

As the intensity distribution of the return light decreases with increasing distance from the optical axis O, contamination of the protective window 24 can be detected more easily with increasing distance from the optical axis O. Thus, it is highly probable that the weights determined by learning satisfy $w_1<w_2$. The discriminant function u is generated by the above-described learning. In a case where the return light measurement unit 15 is a camera, the number of sensor elements increases, and thus the discriminant function u is defined as follows.

$$u=w_0+w_1x_1+w_2x_2\ldots+w_ix_i$$

Moreover, in a case where the return light measurement unit 15 includes a plurality of sensor elements (e.g., thermocouples, etc.) arranged concentrically, the sets $P_1$ and $P_2$ of the sensor elements are both one, and thus each of the values of $x_1$ and $x_2$ is 0 or 1.

Figure 4:
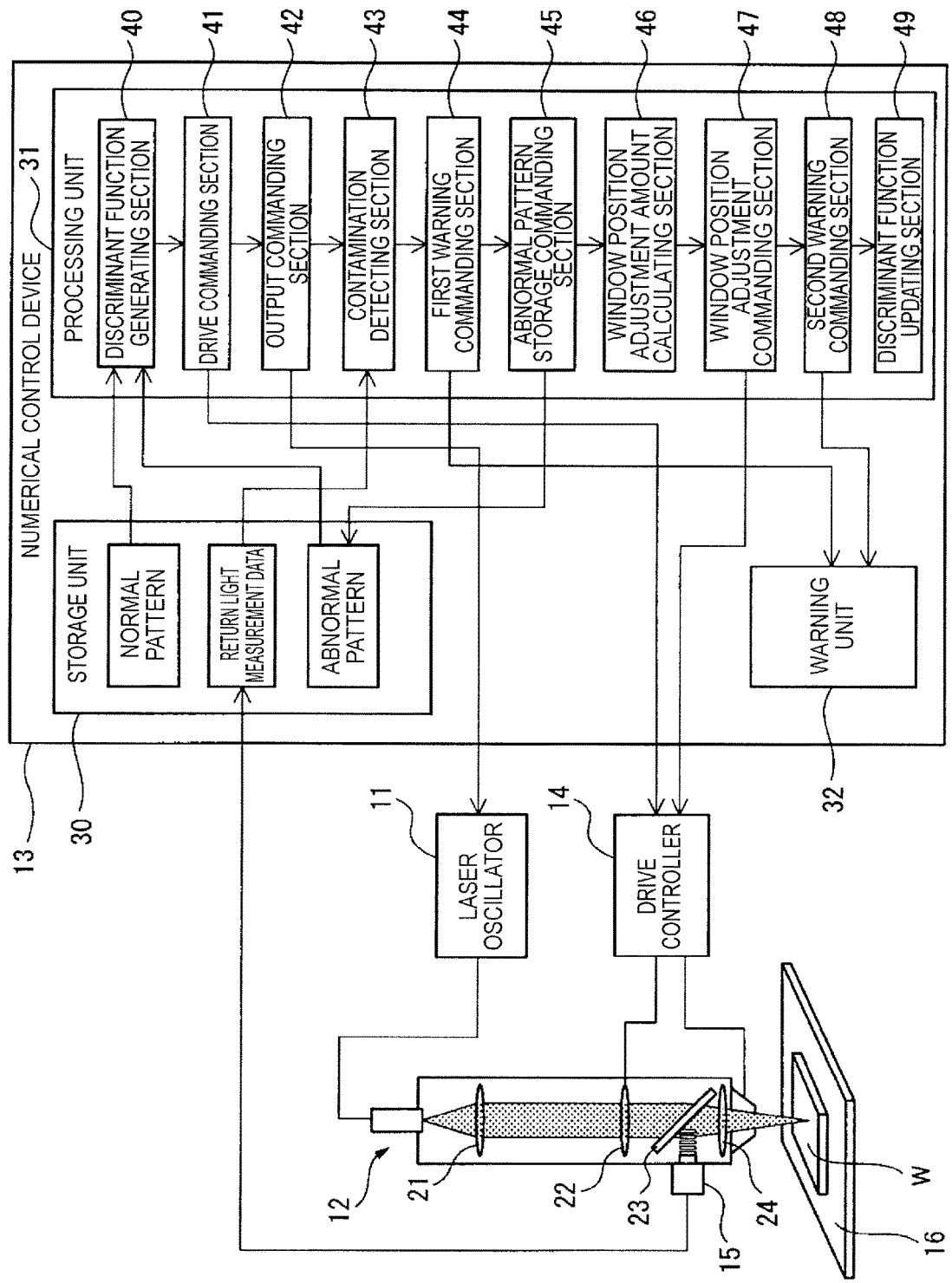
FIG. 4 is a block diagram illustrating the configuration of a numerical control device according to one embodiment.

FIG. 4 is a block diagram illustrating the configuration of the numerical control device according to the present embodiment. The numerical control device 13 includes a storage unit 30 including a RAM, a ROM, a nonvolatile memory, or the like storing various data, a processing unit 31 including CPUs, ASICs, FPGAs, or the like, and a warning unit 32 including a display panel, a speaker, an output interface, and the like. The storage unit 30, the processing unit 31, and the warning unit 32 are connected with each other by buses or the like. The processing unit 31 performs the process of detecting contamination of the protective window 24 during laser processing, and the warning unit 32 warns of contamination of the protective window 24 in accordance with the process by the processing unit 31.

The storage unit 30 prestores at least one of the normal pattern data representing the intensity distribution of the return light when the protective window 24 is in normal condition and the abnormal pattern data representing the intensity distribution of the return light from the workpiece when the protective window is contaminated. In addition, the storage unit 30 stores return light measurement data representing the intensity distribution of the return light measured by the return light measurement unit 15.

The components of the processing unit 31 are implemented by program modules executed by CPUs or integrated circuits including ASICs, FPGAs, or the like. As described above, the processing unit 31 includes a discriminant function generating section 40 generating the discriminant function u for discriminating contamination of the protective window 24 using at least one of the normal pattern data and the abnormal pattern data as the teaching data. The processing unit 31 further includes a drive commanding section 41 issuing commands for the drive controller 14 to move the optical axis of the output light onto the workpiece W in accordance with processing conditions and an output commanding section 42 issuing commands for the laser oscillator 11 to output the laser beam in accordance with the processing conditions.

The processing unit 31 further includes a contamination detecting section 43 detecting contamination of the protective window 24 based on the return light measurement data measured by the return light measurement unit 15 and at least one of the normal pattern data and the abnormal pattern data. The contamination detecting section 43 may detect contamination of the protective window 24 by determining the difference between the return light measurement data and at least one of the normal pattern data and the abnormal pattern data, and preferably detects contamination of the protective window 24 based on the return light measurement data and the discriminant function u generated by the discriminant function generating section 40 (i.e., by pattern recognition).

The processing unit 31 may further include a first warning commanding section 44 issuing commands for the warning unit 32 to warn of contamination of the protective window 24 and an abnormal pattern storage commanding section 45 issuing commands for the storage unit 30 to store the return light measurement data as an abnormal pattern when contamination of the protective window 24 is detected.

The processing unit 31 may further include a window position adjustment amount calculating section 46 calculating the amount of position adjustment for adjusting the position of the protective window 24 when contamination of the protective window 24 is detected and a window position adjustment commanding section 47 issuing commands for the drive controller 14 to move the protective window 24 based on the amount of position adjustment. The processing unit 31 may further include a second warning commanding section 48 issuing commands for the warning unit 32 to warn that excessive contamination of the protective window 24 exists when contamination of the protective window 24 is still detected after the position adjustment of the protective window 24.

The processing unit 31 may further include a discriminant function updating section 49 updating the parameters (i.e., the above-described "weights") of the discriminant function u when contamination of the protective window 24 detected by the contamination detecting section 43 does not exist. That is, the discriminant function updating section 49 reads the return light measurement data when contamination of the protective window 24 is detected by the contamination detecting section 43 as a normal pattern, and updates the parameters of the discriminant function u.

Figure 5:
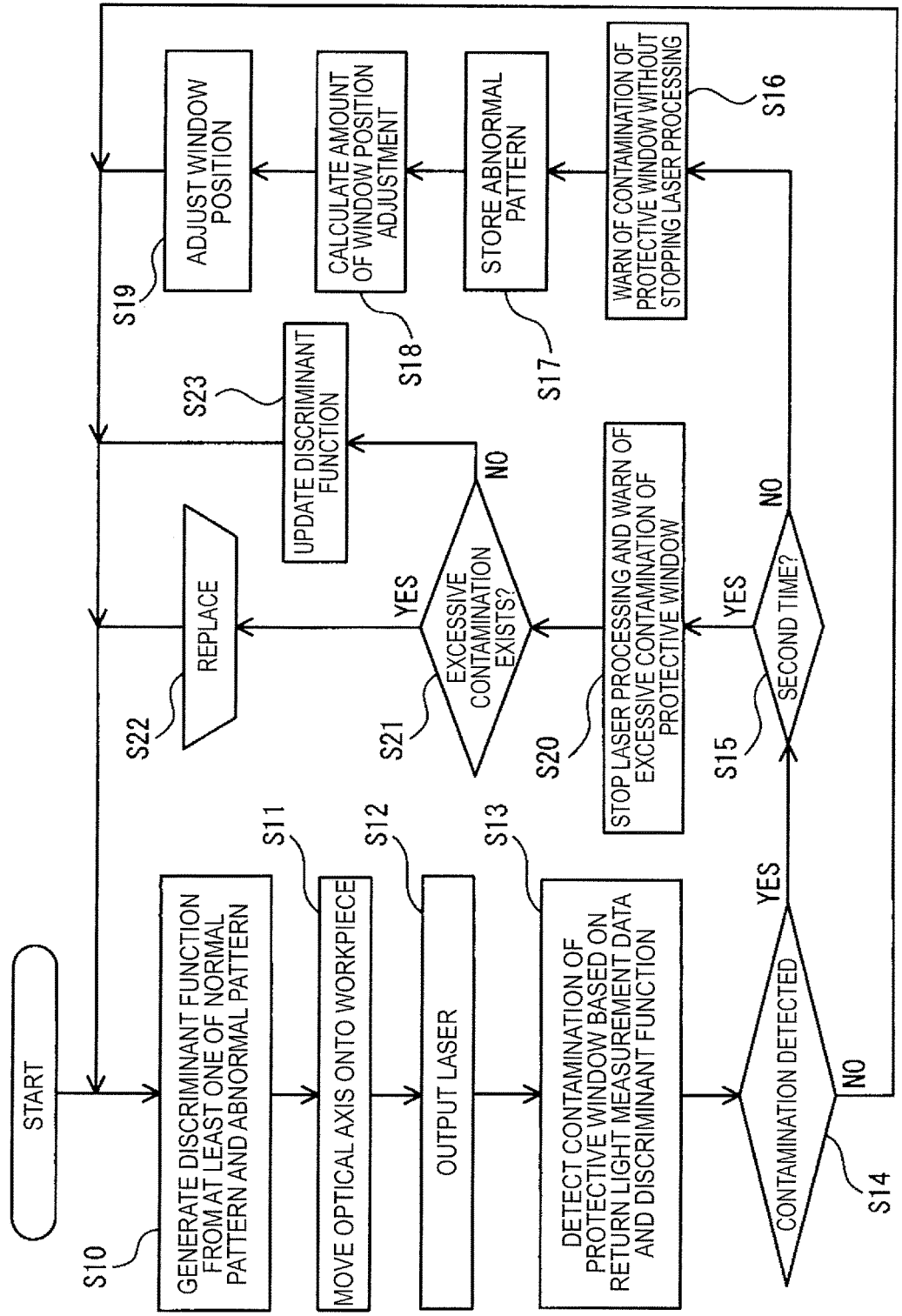
FIG. 5 is a flowchart illustrating operations of the laser processing device according to one embodiment.

FIG. 5 is a flowchart illustrating operations of the laser processing device 10 according to the present embodiment. When the process of identifying contamination of the protective window 24 is started during laser processing, the discriminant function u is generated from at least one of the normal pattern data and the abnormal pattern data in Step S10. In Step S11, a command is issued for the drive controller 14 to move the optical axis onto the workpiece W in accordance with processing conditions. In Step S12, a command is issued for the laser oscillator to output a laser beam in accordance with the processing conditions.

In Step S13, contamination of the protective window 24 is detected based on the return light measurement data and the discriminant function u. In Step S14, when contamination of the protective window 24 is not detected (NO in Step S14), the process returns to Step S10, and the laser processing is continued. On the other hand, when contamination of the protective window 24 is detected in Step S14 (YES in Step S14), it is determined whether it is the second time in Step S15 (NO in Step S15), and a command is issued for the warning unit 32 to warn of contamination of the protective window 24 without stopping the laser processing in Step S16. In Step S17, a command is issued for the storage 30 to store the return light measurement data when contamination of the protective window 24 is detected as an abnormal pattern.

In Step S18, the amount of position adjustment for adjusting the position of the protective window 24 is calculated such that contamination of the protective window 24 lies outside the area of the output light. In Step S19, a command is issued for the drive controller 14 to adjust the position of the protective window 24. To confirm the position of the protective window 24 is correctly adjusted, the process returns to Step S10, and the process of detecting contamination of the protective window 24 is repeated.

In Step S10, the discriminant function u is again generated from at least one of the normal pattern data and the abnormal pattern data. In a case where the abnormal pattern is stored in Step S17, the abnormal pattern is necessary for updating the discriminant function u in Step S10. When contamination of the protective window 24 is still detected after the position adjustment of the protective window 24 in Step S14 (YES in Step S14), it is determined as the second time in Step S15 (YES in Step S15). Thus, the laser processing is stopped, and a command is issued for the warning unit 32 to warn of excessive contamination of the protective window 24. When an operator checks the protective window 24 and finds excessive contamination in Step S21 (YES in Step S21), the operator cleans or replaces the protective window 24.

On the other hand, when the operator checks the protective window 24 and does not find any excessive contamination in Step S21 (NO in Step S21), the parameters of the discriminant function u are updated in Step S23. Repetition of the above-described learning allows contamination of the protective window 24 to be accurately warned of even during laser processing in which the intensity distribution of the return light is unstable. Consequently, the automatic operation can be continued without a large amount of processing defects. In addition, successful correction allows the maintenance period of the protective window 24 to be extended.

A program that can be executed by a computer in the above-described embodiment can be provided having been recorded in a computer-readable non-transitory recording medium, a CD-ROM, or the like. Although some embodiments have been described in this specification, the present invention is not intended to be limited to the above-described embodiments, and it is to be understood that many changes can be made without departing from the scope of the appended claims.

The invention claimed is:

1. A laser processing device for determining the presence of contamination on a protective window during laser processing, the laser processing device comprising:
    a laser oscillator;
    an external optical system including a focusing lens configured to focus a light output from the laser oscillator and a protective window disposed downstream of the focusing lens;
    a beam splitter disposed between the focusing lens and the protective window;
    a plurality of sensor elements arranged two-dimensionally or arranged concentrically and configured to measure intensity distribution pattern of a return light reflected from a workpiece and returning to the external optical system via the beam splitter;
    a memory configured to store at least one of normal pattern data representing the intensity distribution pattern of the return light from the workpiece when the protective window is in normal condition and abnormal pattern data representing the intensity distribution pattern of the return light from the workpiece when the protective window is contaminated;
    a processor configured to:
        perform a process of detecting contamination on the protective window by pattern recognition based on at least one of the normal pattern and the abnormal pattern and the intensity distribution pattern measured during laser processing, and
        output a warning when the contamination on the protective window is detected; and
    a drive controller configured to move the protective window in a direction orthogonal to an optical axis of an output light,
    wherein the processor is further configured to calculate an amount of position adjustment for adjusting a position of the protective window when contamination on the protective window is detected and issue a command for the drive controller to move the protective window based on the amount of position adjustment.

2. The laser processing device of claim 1, wherein the processor is further configured to:
    generate a discriminant function for discriminating contamination on the protective window using at least one of the normal pattern data and the abnormal pattern data as teaching data, and
    detect contamination on the protective window based on the measured intensity distribution pattern and the discriminant function.

3. The laser processing device of claim 2, wherein the processor is further configured to update a parameter of the discriminant function when the detected contamination of the protective window does not exist.

4. The laser processing device of claim 1, wherein the processor is further configured to issue a command for the memory to store the measured intensity distribution pattern as the abnormal pattern when contamination on the protective window is detected.

5. A laser processing device for determining the presence of contamination on a protective window during laser processing, the laser processing device comprising:
    a laser oscillator;
    an external optical system including a focusing lens configured to focus a light output from the laser oscillator and a protective window disposed downstream of the focusing lens;
    a beam splitter disposed between the focusing lens and the protective window;
    a plurality of sensor elements arranged two-dimensionally or arranged concentrically and configured to measure intensity distribution pattern of a return light reflected from a workpiece and returning to the external optical system via the beam splitter;
    a memory configured to store at least one of normal pattern data representing the intensity distribution pattern of the return light from the workpiece when the protective window is in normal condition and abnormal pattern data representing the intensity distribution pattern of the return light from the workpiece when the protective window is contaminated; and
    a processor configured to:
        perform a process of detecting contamination on the protective window by pattern recognition based on at least one of the normal pattern and the abnormal pattern and the intensity distribution pattern measured during laser processing,
        output a warning when the contamination on the protective window is detected,
        generate a discriminant function for discriminating contamination on the protective window using at least one of the normal pattern data and the abnormal pattern data as teaching data, and
        detect contamination on the protective window based on the measured intensity distribution pattern and the discriminant function,
    wherein the plurality of sensor elements is arranged to surround an optical axis of the return light, and
    wherein the discriminant function includes the number of sensor elements detecting intensity of the return light higher than a predetermined intensity in a set of sensor elements surrounding the optical axis, the number of sensor elements detecting intensity of the return light higher than a predetermined intensity in a set of sensor elements surrounding the set of the sensor elements, and weighting parameters for weighting the numbers of sensor elements respectively.

6. The laser processing device of claim 5, wherein the weighting parameter becomes larger as the set of sensor elements gets away from the optical axis of the return light.

* * * * *